United States Patent Office 3,560,549
Patented Feb. 2, 1971

3,560,549
BETA-CYANOALKYL ETHERS OF POLYOXY-
ALKYLENE ADDUCTS OF MODERATELY
HIGH MOLECULAR WEIGHT
Fedor Poppelsdorf, Charleston, W. Va., assignor to
Union Carbide Corporation, a corporation of New
York
No Drawing. Application June 26, 1963, Ser. No. 290,578,
now abandoned, which is a continuation-in-part of
abandoned applications Ser. No. 107,060, May 2, 1961,
and Ser. No. 230,253, Oct. 12, 1962. Divided and this
application Dec. 8, 1967, Ser. No. 688,976
Int. Cl. C07c 121/00, 121/46, 121/66
U.S. Cl. 260—465                                  26 Claims

ABSTRACT OF THE DISCLOSURE

Novel cyano compositions are disclosed as well as methods for their preparation. Representative compounds comprise:

(1) α-(2-cyanoethoxy)-ω-(n-butyl)-poly-1,2-oxypropylene
(2) α-ω-bis-(2-cyanoethoxy)-poly-1,2-oxypropylene-1,4, oxybutylene
(3) α-ω-bis-(2-cyanoethoxy)-poly-1,2-oxypropylene
(4) α-ω-bis-(2-cyanoethoxy)-poly-1,2-oxybutylene
(5) 1,2,6-tris[α-(cyanoethoxy)-poly-1,2-oxypropyl] hexane
(6) 1,2,3-tris[α(2-cyanoethoxy)-poly-1,2-oxypropyl] propane
(7) the tris(2-cyanoethyl)-ether of oxypropylated tris-(4-hydroxyphenyl)propane The instant cyanoethers have biological activity suitable for agricultural use and are intermediates for amines, acids and esters.

---

This application is a divisional application of Ser. No. 290,578, entitled "Nitrile Compositions" by Fedor Poppelsdorf, filed June 26, 1963, now abandoned, which is a continuation-in-part of application Ser. No. 107,060, filed May 2, 1961 now abandoned and application Ser. No. 230,253 filed Oct. 12, 1962 now abandoned.

This invention relates to novel beta-cyanoalkyl ethers of polyoxyalkylene adducts of moderately high molecular weight, derivatives thereof, and to compositions containing the same.

The cyano products of this invention are characterizable as a recurrent branched-chain oxyalkylene structure extending from an organo radical. These products desirably comprise recurring polyoxy-1,2-alkylene units, e.g., at least two units, in a molecular chain terminated at at least one end thereof by a beta-cyanoalkyl moiety. A significant aspect of this invention is that at least 50 percent of the oxyalkylene units are 1,2-oxyalkylene where the alkylene moiety has a pendant monovalent organic group positioned beta to an oxy moiety.

The products of this invention are more specifically characterized as a mixture of molecules containing beta-cyanoalkyl moieties and divalent dioxy-terminated polyoxyalkylene moieties. It is particularly desirable that the mixture have an average molecular weight of at least about 450. The divalent dioxy-terminated polyoxyalkylene moiety should be sufficiently present to comprise at least about 10 percent by weight of the mixture. Moreover, the beta-cyanoalkyl moieties should be at least 80 percent, up to 100 percent, of the molar quantity of the divalent polyoxyalkylene moieties.

In terms of more specific structural association of the components of the mixture, the divalent dioxy-terminated polyoxyalkylene moiety consists of recurring units of alkylene oxide. At least 50 percent of these units are 1,2-oxyalkylene where the alkylene moiety thereof has a pendant monovalent hydrocarbon group positioned beta to an oxy moiety. Substantially, each of the divalent polyoxyalkylene moieties (at least 80 percent of the moieties) are joined at one free valence of the terminal oxy portion with one of the beta-cyanoalkyl moieties by a noncarbonyl

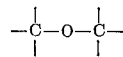

(ether) linkage and at the free valence of the other terminal oxy portion with an organic chain-extending radical or an organic chain-blocking radical by a similar ether linkage. These radicals may comprise up to about 80 percent by weight of the mixture. The organic chain-extending radical is a poly-free valence bearing organic radical where each of the free valences is that of a different carbon atom of the radical and at least two of the free valence carbon atoms are joined to polyoxyalkylene moiety with any remaining free valences of the radical bonded directly to hydroxyl groups. On the other hand, the organic chain-blocking radical is a monovalent organic radical where the free valence is that of a carbon atom of the radical.

The organic chain-extending radical serves the function of interlinking at least two polyoxyalkylene moieties through the radical. The radical is the residue of a polyhydroxy organic compound where at least two of the hydroxyl groups thereof are removed forming the free valances for chain extension. However, this definition is not intended to imply that chain extension is achieved by actual removal of the hydroxyl groups of the compound, but rather that the radical is definable as the residue of the compound by deleting the hydroxyl groups.

The radical may be obtained from a wide variety of polyhydroxy organic compounds, desirably one having a molecular weight of at least about 62, typically not in excess of about 425. The compound may contain atoms other than carbon, oxygen and hydrogen, so long as these atoms are part of the eventual radical and are devoid of substituent groups or atoms capable of cleavage from the radical in the presence of an alcohol. Illustrative of the variety of the compounds are, e.g., bis(gamma-hydroxypropyl) dimethyl silane, bis(4-hydroxyphenyl)diethyl silane, pyrogallol, cyanuric acid, tris(2-hydroxyethyl)phosphine oxide, triethanolamine, and the like. However, the most preferred compounds are those which solely contain carbon, hydrogen and oxygen where oxygen is in the residue or is solely part of the hydroxyl groups. Further illustration of these preferred compounds is made below.

The organic chain-blocking radical, as pointed out previously, is monovalent where the free valence is that of a carbon atom of the radical. This radical, as is the similar case with the chain-extending radical, is definable as the residue of a monohydroxylated compound, i.e., the hydroxyl group is deleted from the compound to form the radical. This radical may be obtained from a wide variety of monohydroxy organic compounds and desirably is from one having a molecular weight of at least about 32 though typically not in excess of about 400. The monohydroxy compound may contain atoms other than carbon, hydrogen and oxygen, so long as these atoms are part of the eventual radical and are devoid of substitutent groups or atoms capable of cleavage in the presence of an alcohol. Illustrative of the compounds are, e.g., gamma-hydroxypropyl trimethyl silane; 4-hydroxyphenyl triphenyl silane; the mono alkyl ethers of ethylene glycol, dipropylene glycol, tetraethylene glycol; dimethyl cyanurate; 2-hydroxyethyl dimethyl phosphine or phosphine oxide; N,N-diethyl-N-(2-hydroxyethyl)amine; and the like. However, the most preferred compounds are those which solely contain carbon, hydrogen and oxygen where oxygen is in the residue or is solely part of the hydroxyl group.

The particularly preferred cyano substituted ethers of this invention are characterized by the formula:

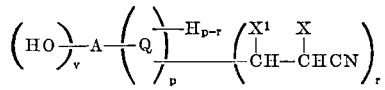

wherein A may be a radical such as

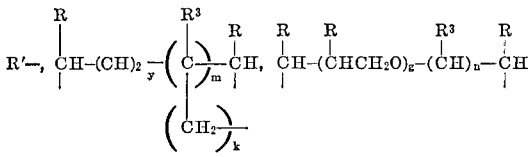

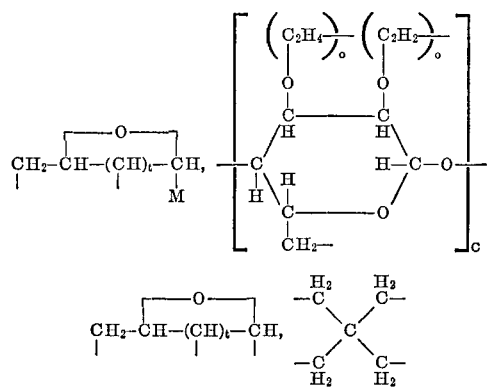

and

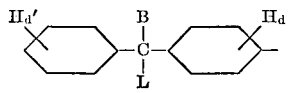

Q is a dioxy (—O—) terminated polyoxyalkylene radical having recurring units of the structure

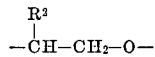

alone, or combined with units of the structure

so long as at least fifty percent of the units of said polyoxyalkylene radical are

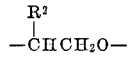

said polyoxyalkylene radical having an average of from about 6 to 250 of said recurring units, preferably an average of from about 10 to 150 of said recurring units; $p$ is an integer of at least 1 and which preferably is equal to the free valence of the radical A and typically is an integer of from 1 to 10, $v$ is an integer equal to the free valence of the radical A minus the value of $p$ and typically is a value of from 0 to 4; $r$ is an integer of at least 1 and not greater than the value of $p$, and $r$ typically has an average value of at least 80 percent of that of $p$, preferably at least 90 percent of that of $p$; each R and $R^3$ may be one of hydrogen, an alkyl group of from 1 to 18 carbon atoms, preferably from 1 to 4 carbon atoms, cycloalkyl of from 5 to 7 carbon atoms, or an aryl group; $R^2$ may be an alkyl group of from 1 to 18 carbon atoms, preferably from about 1 to 4 carbon atoms, cycloalkyl of from 5 to 7 carbon atoms, or an aryl group; X and $X^1$ may be hydrogen or an alkyl group, particularly of from 1 to 8 carbon atoms and preferably of from 1 to 4 carbon atoms; $y$ is an integer of from 0 to 10; $m$ is an integer of from 0 to 8; $b$ is an integer of from 1 to 3; $g$ can be an integer of from 1 to 10; $k$ is one of the integers 0 and 1, and preferably is the integer 1 when $R^3$ is alkyl, as defined above; $h$ can be an integer of from 1 to 8; $t$ is an integer of from 2 to 4, $c$ is a number having an average value of at least 2; M is a radical which can be alkyl, aralkyl,

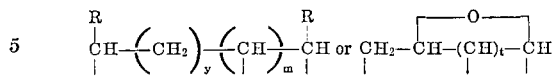

$o$ is the integer 0 or 1; R' is a monovalent organic radical wherein the free valence is supplied by a carbon atom of said radical, for example, R' may be alkyl (1 to 18 carbon atoms), monoether of a glycol residue, cycloalkyl (4 to 12 carbon atoms), aryl, alkaryl, and aralkyl; B is hydrogen or an alkyl group of from 1 to 4 carbon atoms; L is B or

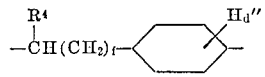

wherein the free valence of the

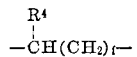

group is the valence bond of L; $d$, $d'$ and $d''$ are each equal to 4 or 10; $f$ is either a value of 0 or 1; and $R^4$ is methyl when $f$ is 0 and hydrogen when $f$ is 1. It is to be noted that A in the above formula encompasses the chain-extending or chain-blocking radicals discussed previously.

The above compositions possessing molecular weights of at least about 450 and up to 20,000 and more, are typically found to have desirable biological activity suitable for agricultural use.

Moreover, these unique polymeric cyano-ether compounds are significantly desirable intermediates for producing corresponding amines, carboxylic acids, and carboxylic acid esters. The amine is readily produced by hydrogenation of the aforementioned beta-cyano ethers, particularly in accordance with the techniques described herein, resulting in the production of the corresponding gamma-amino ethers. On the other hand, the beta-cyano ethers may be hydrolyzed in accordance with well-known techniques to convert the cyano group to carboxylic whereby to produce a beta-carboxy ether corresponding to the above formula except that the cyano group is carboxy.

The ester may be formed by conventional direct esterification from the reaction of the nitrile group with a hydroxylated organic compound in the presence of an anhydrous mineral acid (such as HCl) followed by water addition.

The amino, carboxylic acid and ester products, particularly those having molecular weights of at least 450, may be used as lubricating oils for the purpose of lubricating moving frictional surfaces, as components in the manufacture of resinous products through reaction of the amino or carbonyloxy groups with other complementary polyfunctional compounds such as polyisocyanates, polyols, polycarboxylic acid, their anhydrides and acid halides, polyepoxides, and the like. The aminoether derivatives have been found significantly desirable in the manufacture of foams when reacted with polyisocyanates.

As mentioned above, the cyano ethers of this invention have useful properties for biological purposes, especially in the field of fungicides. These compounds possess a wide range of fungicidal activity with a high level of performance. The novel beta-cyanoethyl ethers may be used alone or in conjunction with other fungicidal and insecticidal agents, and can be formulated with inert diluents or carriers and applied as granules, powders, dusts, solutions or suspensions therein, for effective use on desirable plant life to eradicate or prevent the growth of a broad spectrum of parasitic fungi without deleterious effects upon the hosts, particularly a host in foliage.

These beta-cyanoalkyl ethers may be prepared by contacting, in the presence of a basic condensing agent, a hydroxylated adduct of an alkylene oxide with hydroxy compounds, such as

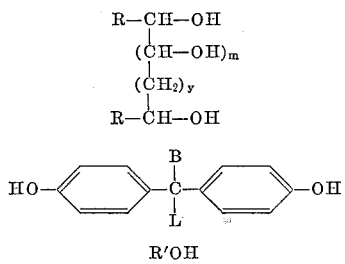

R'OH pentaerythritol and/or others described herein (R, R', $m$, B, L and $y$ are defined above), with an olefinically unsaturated hydrocarbon nitrile wherein the ethylenic group is conjugated with the nitrile group, such as an ethylenically unsaturated aliphatic hydrocarbon nitrile, e.g., acrylonitrile and/or its substituted derivatives, such as α-alkyl substituted acrylonitrile (e.g., methacrylonitrile, α-ethyl acrylonitrile, α-propyl-acrylonitrile, α-octyl acrylonitrile) and β-alkyl acrylonitrile (e.g., crotononitrile, and the like) for a period of time sufficient to form the corresponding beta-cyanoalkyl ether addition products. The residues of these hydroxy compounds form the chain-extending or chain-blocking radicals discussed previously. The cyanoalkylation of the hydroxylated adducts generally proceeds smoothly at around room temperature. However, reaction temperatures within the range of from about 0° C. or lower, to 100° C. or higher, are within the broad purview of this invention. The reaction is typically exothermal and the reaction mixture is advantageously intermittently cooled to minimize possibilities of undesirable side reactions.

While stoichiometric proportions of the polyols and nitrile reactants are desirable, as illustrated by the following representative equations relating to the use of poly-1,2-oxypropylene:

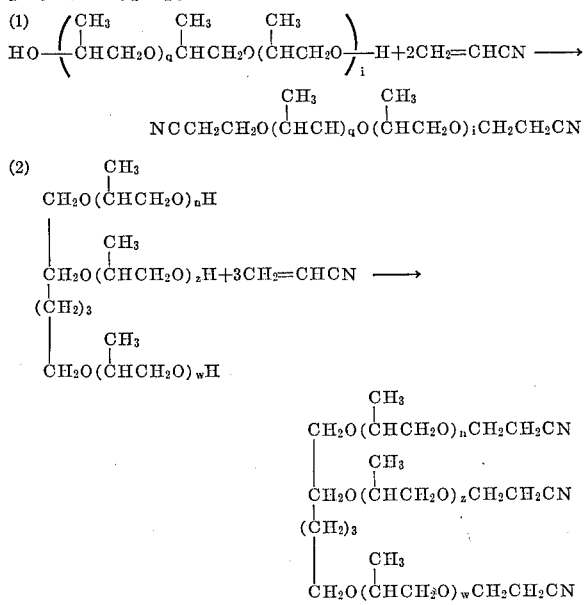

an excess of either reactant can be employed. In the above formulae, $n$, $z$ and $w$ are positive integers, the sum of which is from about 8 to 250 preferably from about 10 to 150; $i$ is an integer of at least 2 and $q$ is an integer of at least 6, the sum of $i$ and $q$ being from 8 to 250.

In preferred operation, the nitrile is added in small successive amounts to an agitated mixture of the hydroxylated component and a basic (alkaline) condensing agent. Although it is not necessary, the reaction can be conducted in an inert solvent or suspending medium. Dioxane, hexane, pentane, heptane, octane, benzene, toluene, tetrahydrofuran, triethylamine, pyridine, cyclohexane, and the like solvents can be employed for this purpose.

The basic agent may be employed in small catalytic quantities so as to effect the reaction between the nitrile and the hydroxylated compound. Typically, the amount of basic agent is from about 0.01 to about 5 weight percent, preferably from 0.05 to 2 weight percent, of the hydroxylated adduct component of the reaction. Examples of basic condensing agents include the alkali metal and alkaline earth metal hydroxides such as sodium hydroxide, potassium hydroxide, cesium hydroxide, calcium hydroxide, barium hydroxide, and substances yielding such hydroxides in aqueous solutions such as e.g., the alcoholates, oxides and the like of the aforementioned metals. Other condensing agents include the alkali metal amides such as sodamide and the product of the reaction of sodium and pyridine to form the corresponding amide structure; quaternary ammonium compounds such as benzyltrimethylammonium hydroxide, tetrakis(2-hydroxyethyl) ammonium hydroxide and the like; and anhydrous hydrides of the alkali metals and alkaline earth metals. In those cases where the hydroxyl groups of the hydroxylated adduct are predominantly secondary, the preferred basic agents are the alkali metal hydroxides, alcoholates, oxides and the like.

When the reaction is conducted at about room temperature, the condensation is typically completed in less than 8 hours after terminating addition of acrylonitrile or any of the other nitrile components. The course of reaction may be followed by infra-red analysis, the end point being indicated when there is no further reduction in the absorption band due to hydroxyl moiety. The basic condensing agent is advantageously neutralized by the addition to the reaction mixture of an acid, preferably phosphoric acid. Any unreacted acrylonitrile or other nitrile and water may be removed from the reaction mixture under reduced pressure at temperatures typically not exceeding about 100° C. thereby leaving a still residue of desired beta-cyanoalkyl ether. The vacuum-stripping operation is advantageously continued until the weight of the residue remains constant. In most cases, when prepared by the aforedescribed method, special purification steps other than those described herein may be avoided. Usually, the product is a clear and almost colorless oil.

The hydroxylated adduct starting materials which are reactable with the aforementioned ethylenically unsaturated nitriles are obtainable by addition of alkylene oxides (i.e., epoxy alkanes) to an initiating hydroxy substituted organic compound in which the hydroxy substituent is bonded to a carbon atom of the organic compound. As mentioned previously, these hydroxy organic compounds encompass the chain-extending or chain-blocking radicals discussed above. Thus, various 1,2-alkylene oxides such as 1,2-propylene oxide, 1,2-butylene oxide, 1,2-hexylene oxide, 1,2-dodecylene oxide, cyclohexyl ethylene oxide, etc., and styrene oxide, or mixtures thereof, or together with not more than 50 mole percent ethylene oxide, basis total moles of alkylene oxide, may be polymerized by contact with a basic or acidic catalyst in the presence of an initiating hydroxy organic compound. The aforementioned 1,2-alkylene oxides may be copolymerized with 1,3- and 1,4-alkylene oxides by acid catalytic polymerization in the presence of an initiating hydroxy organic compound, provided however, that at least 50 mole percent of the alkylene oxide reacted possess a monovalent hydrocarbon moiety bonded to a carbon atom directly attached to an oxygen atom forming the epoxy ring. Illustrative of various 1,3- and 1,4-alkylene oxides include 1,3-propylene oxide, 1,4-butylene oxide (tetrahydrofuran), 1,4-pentylene oxide, 1,4-octylene oxide, etc., and 1,4-epoxy-2-phenyl butane, and the like.

The initiating hydroxy organic compound may be any one of the polyols previously described and include 1,2-alkylene glycol, 1,3-alkylene glycol, 1,4-alkylene glycol, alkylene triols, alkylene tetrols, alkylene pentols, alkylene hexols, polyalkylene glycols, etc. Illustrative of these materials include ethylene glycol, 1,2- and 1,3-dihydroxypropane, 1,2-, 1,3- and 1,4-dihydroxybutane, 1,2-, 1,3- and 1,4-dihydroxypentane, 1,2-, 1,3- and 1,4-dihydroxyhexane, 1,2-, 1,3- and 1,4-dihydroxydecane, 1,2-, 1,3- and 1,4-dihydroxyoctadecane, and the alpha, omega diols of the above hydrocarbon moieties not indicated as such. Polyalkylene glycols include diethylene glycol, triethylene glycol, tetraethylene glycol, 1,2- and 1,3-dipropylene glycol, 1,2- and 1,3-tripropylene glycol, 1,2- 1,3- and 1,4-dibutylene glycol, 1,2-, 1,3-, and 1,4-tributylene glycol, etc. Triols which may be utilized as the initiating hydroxy organic compound include glycerol, trimethylol propane, 1,2,3-trihydroxybutane, 1,2,3-trihydroxypentane, 1,2,3-trihydroxyoctane, 1,2,3-trihydroxydecane, 1,2,4-trihydroxybutane, 1,2,4-trihydroxyhexane, 1,2,6-trihydroxyhexane, 1,2,8-trihydroxyoctane, and the like. Illustrative of other polyols which are suitable initiators include sorbitol, pentaerythritol, erythritol, aromatic hydroxy compounds of the formula:

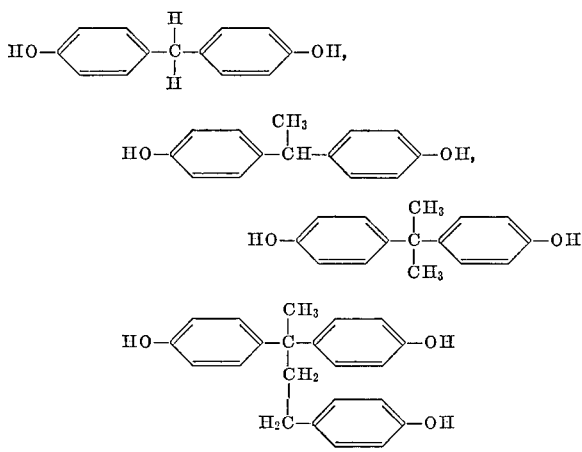

and the like, and the saturated (non-benzenoid) derivatives thereof; various other carbohydrates such as monosaccharides and polysaccharides, e.g., cellulose; starch; glucosides, such as the lower alkyl (1 to 6 carbon atoms) glucosides, e.g. methyl-D-arabinoside, methyl-D-xyloside, ethyl-D-xyloside, n-butyl-D-riboside, methyl, ethyl, propyl, butyl, and 2-ethylhexyl-D-glycoside, 2-ethylhexyl-D-fructoside, isobutyl - D - mannoside, ethyl-D-galactoside, benzyl-D-glucoside and methyl-L-rhammoside; sucrose; glucose glycoside, maltose; lactose; D-gulose; D-iodose; hydroxyethyl cellulose; amylose; amylopectin; dextrin; and the like.

The initiator may also be any carbon-bonded monohydroxy organic compound, whether an actual alcohol or not. Inclusive of monohydroxy alcohols are the normal or branched chain alkanols such as methanol, ethanol, n-propanol, isopropanol, n-butanol/, sec.-butanol, tert.-butanol, n-pentanol, 2-pentanol, 3-pentanol, tert.-pentanol, n-octanol, 2-ethyl hexanol, and the like; and cycloaliphatic alcohols such as cyclobutanol, cyclopentanol, cyclohexanol, cycloheptanol, cyclooctanol, and the like. In addition, included are aromatic hydroxy compounds such as phenol and the like; and the alkyl substituted phenols, e.g., p-methyl phenol, 1-hydroxy-3,5-dimethyl benzene, and the like; aralkanols such as benzyl alcohol, hydroxy ethyl benzene and the like. In addition, there may be employed monohydroxy glycols, such as monoether glycols, e.g., monomethyl ether of ethylene glycol, 1,2- and 1,3-propylene glycol, diethylene glycol, di-1,2- and 1,3-propylene glycol, the butylene and polybutylene glycols, and the like; other similar ethers such as, alkyl (1 to 4 carbon atoms), cycloalkyl (5 to 7 carbon atoms), aryl, alkaryl, aralkyl, etc., mono-ethers of the aforementioned glycols.

Desirably, the initiator is admixed with the alkylene oxide in a liquid phase and the basic or acidic catalyst is dispersed throughout this phase. Suitable basic catalysts include alkali metal hydroxides such as sodium hydroxide and potassium hydroxide. Desirable acidic catalysts include Lewis acids such as boron trifluoride, aluminum chloride and the like. The catalyst is added in catalytic amounts, i.e., amounts sufficient to effect reaction between the alkylene oxide and the initiating hydroxylated compound. When the catalyst is alkali metal hydroxide, amounts of from about 0.2 to 1.0 percent by weight of the alkylene oxide reactant is convenient. When the catalyst is a Lewis acid, such as boron trifluoride, amounts of from about 0.01 to 1.0 percent by weight of the alkylene oxide reactant are suitable. The reaction can be effected at temperatures of from 80° C. to about 160° C. and advantageously under pressures ranging from about 5 to 50 pounds per square inch gauge. The reaction is preferably carried out under essentially moisture free (anhydrous) conditions to minimize side reactions. The addition of the alkylene oxide is terminated when the calculated quantities thereof have been introduced into the system.

The above process to form the hydroxylated adducts is well understood by the art and forms no part of this invention. The resulting hydroxylated adduct from the aforementioned reaction is often a mixture of molecules of varying molecular weights. These mixtures are suitable for preparing the novel beta-cyanoalkyl ethers of this invention. The average molecular weight of the adduct is ascertainable by the acetylation of the various hydroxy groups.

A further embodiment of the invention involves a most useful method for the purification of the aforementioned cyanoalkylated compounds. Since the process for the reaction of the ethylenically unsaturated nitrile compounds and the hydroxylated ether adduct is effected in the presence of a basic catalyst, a portion of the ethylenically unsaturated nitrile, such as in the case of acrylonitrile, methacrylonitrile, etc., is typically caused to polymerize whereby to form an impurity of polymerized nitrile (hydrocarbon polynitrile) such as polyacrylonitrile and polymethacrylonitrile. This polymer may exist predominantly as a block copolymer of acrylonitrile and polyether adduct rather than as a true homopolymer.

Ordinarily, the presence of polyacrylonitrile per se would be of little concern in the manufacture of low molecular weight cyanoethylated compounds because they are purifiable by distillation. However, cyanoalkylation of the aforementioned hydroxylated polyether adducts yield products which are not readily purified by distillation particularly due to their excessively high boiling points. Moreover, the cyanoalkylated compounds of this invention are often not thermally stable at elevated temperatures close to their boiling points reverting to the alcohol and ethylenically unsaturated nitrile. In addition, the polyacrylonitrile is soluble in the cyanoalkylated products of this invention and also exhibit similar chemical characteristics. Hence, complete removal of the polyacrylonitrile by known separation methods such as crystallization, absorption, filtration and the like is not practical.

In addition to the above, it was unexpectedly found that the presence of the polymerized nitrile impurity in the cyanoalkylated product serves to poison the hydrogenation catalyst when the cyanoalkylated product is reduced to the corresponding amine derivative. Thus, hydrogenation is rendered difficult and expensive, necessitating special techniques and uneconomically high catalyst concentrations. It is apparent that it is desirable to remove such polymerized nitrile impurities for the purpose of the hydrogenation process described herein in the manufacture of the corresponding amines of this invention.

Purification of beta-cyanoalkyl ether products, such as described above, is readily effected by forming a mixture of a beta-cyanoalkyl ether product and an inert liquid organic solvent in which the ether product is soluble and in which the polymerized ethylenically unsaturated nitrile ("polynitrile") such as polyacrylonitrile, polymethacrylonitrile, etc., is insoluble and precipitates. The solution of the ether product is separated from the polynitrile precipitate and thereafter the "pure" ether product is readily recovered from the solvent by, for example, evaporation of the solvent.

The beta-cyanoalkyl ether products of this invention having a molecular weight in excess of about 450 typically possess sufficient hydrophobic characteristics as contrasted with the more hydrophilic lower molecular weight species so that they are readily dissolved in the solvent to effect this purification process. The lower molecular weight species (below about 450) of the aforementioned ethers are not readily purified in accordance with the technique herein described.

In general, the solvents employed in the practice of the present invention will not necessarily be the same for each compound. In order to obtain optimum purification, the solvent or solvent combination should be appropriately chosen for each cyanoalkylated ether product. For example, the cyanoethylated derivative of polypropylene glycol having a molecular weight of about 2025 was found to be soluble in pentane, hexane, and heptane but immiscible with isooctane or nonane.

The solvents which have been found suitable for use in the practice of this invention are the saturated aliphatic and cycloaliphatic hydrocarbons having boiling points of from about 20° C., and lower, to about 160° C., and higher, determined at atmospheric pressure, more preferably from about 25° C. to about 100° C., and containing up to about 10 carbon atoms, and more preferably from about 5 to about 9 carbon atoms. When the lower molecular weight hydrocarbons are employed which have boiling points below 20° C. at atmospheric pressure, the instant purification process can be conducted at superatmospheric pressures sufficient to maintain the solvent in liquid form. Suitable solvents include, the alkanes and cycloalkanes, such as, propane, butane, pentane, hexane, heptane, octane, nonane, cyclohexane, methylcyclohexane, dimethylcyclohexane, tetraline, Decalin, the petroleum ethers, and the like. Preferred solvents include pentane, hexane, heptane, octane, nonane, and cyclohexane. Particularly preferred solvents are pentane, hexane, heptane, and cyclohexane.

Inasmuch as the cyanoalkylated polyoxyalkylene products in the preferred molecular weight range, but at the lower portion thereof, i.e. from about 450 to about 1000, sometimes cannot be satisfactorily purified with an aliphatic or cycloaliphatic hydrocarbon alone, due to their limited solubility, it is often desirable to employ a co-solvent. The co-solvent must, of course, be capable of effecting complete solution of the solvent and the cyanoalkylated product without also dissolving the poly-ethylenically unsaturated nitrile, e.g., polyacrylonitrile, or adversely affecting the cyanoalkylated product.

Suitable co-solvents which can be employed in conjunction with the aforementioned aliphatic or cycloaliphatic hydrocarbon solvents are those having boiling points within the aforesaid range, i.e., from about 20° C. to about 160° C., more preferably from about 25° C. to about 100° C., and containing up to 12 carbon atoms or more, preferably up to 10 carbon atoms. The co-solvent should have a greater polarity than the solvent. As indicated above for the hydrocarbon solvents, the use of the lower molecular weight co-solvents, i.e., those having boiling points below 20° C., may require that the process be conducted at superatmospheric pressures.

Typical co-solvents include the aliphatic, cycloaliphatic and aromatic ethers, including mixtures thereof, such as, dimethyl ether, methyl ethyl ether, diethyl ether, di-n-propyl ether, diisopropyl ether, methyl-n-butyl ether, ethyl-n-butyl ether, di-n-butyl ether, di-n-amyl ether, di-isoamyl ether, di-n-hexyl ether, ethylene glycol dimethyl ether, dicyclohexyl ether, methyl cyclohexyl ether, ethyl cyclohexyl ether, anisole; the aliphatic, cycloaliphatic and aromatic esters including mixtures thereof, such as, methyl formate, ethyl formate, diethyl carbonate, methyl acetate, ethyl acetate, n-propyl acetate, n-butyl acetate, isobutyl acetate, t-butyl acetate, methyl propionate, ethyl propionate, methyl-n-butyrate, ethyl-n-butyrate, methyl-n-valerate, methyl isovalerate, methyl cyclohexyl carboxylate, ethyl cyclohexyl carboxylate, methyl benzoate, ethyl benzoate; aliphatic, cycloaliphatic and aromatic acetals and ketals, including mixtures thereof, such as acetaldehyde dimethyl acetal, acetaldehyde diethyl acetal, acetaldehyde methyl ethyl acetal, acetaldehyde di-n-butyl acetal, propionaldehyde dimethyl acetal, propionaldehyde diethyl acetal, benzaldehyde dimethyl acetal, acetone ethyl phenethyl acetal; aliphatic ketones, such as acetone, methyl ethyl ketone, methyl-n-propyl ketone, diethyl ketone, methyl-t-butyl ketone, diisopropyl ketone; aliphatic and cycloaliphatic alcohols, such as methyl alcohol, ethyl alcohol, n-propyl alcohol, isopropyl alcohol, n-butyl alcohol, isobutyl alcohol, sec-butyl alcohol, t-butyl alcohol, t-amyl alcohol, cyclohexanol; aliphatic and cycloaliphatic amines, including mixtures thereof, such as, ethylamine, diethylamine, triethylamine, n-propylamine, di-n-propylamine, n-butylamine, n-amylamine, cyclohexylamine; aliphatic, cycloaliphatic, and aromatic hydrocarbons, including alkyl-substituted derivatives thereof, such as, pentane, cyclohexane, benzene, toluene, xylene, tetralin, Decalin; heterocyclic compounds such as, tetrahydrofuran, and the like; halogenated aliphatic hydrocarbons such as, carbon tetrachloride, chloroform, perchloroethylene and the like.

Preferred co-solvents include ethyl formate, ethyl acetate, ethyl propionate, ethyl carbonate, diethyl acetal, dietyhl ether, dibutyl ether, acetone, methyl ethyl ketone, ethyl alcohol, isopropyl alcohol, t-butyl alcohol, triethylamine, carbon tetrachloride, chloroform, tetrahydrofuran, anisole, benzene, toluene and xylene. The particularly preferred co-solvents include diethyl ether, dibutyl ether, ethyl acetate, and tetrahydrofuran.

In some instances where the hydrocarbon solvent alone will satisfactorily effect dissolution of the cyanoethylated product, it may still be desirable for economic considerations to employ a co-solvent. Moreover, a second hydrocarbon solvent is sometimes suitable for use as the co-solvent.

In general, the proportion of solvent to the cyanoalkylated product should be such that all of the cyanoalkylated product is dissolved. The actual amount of solvent will, of course, vary depending upon the particular product being purified, the solvent employed, and other considerations. As a general rule, the proportion of solvent to the cyanoalkylated product should be in a weight ratio of at least 1.5 to 1. In those instances where co-solvents are used, the hydrocarbon solvent should be the major component of the solvent mixture, basis weight of the mixture, to ensure that none of the polyethylenically unsaturated nitriles, e.g., polyacrylonitrile, dissolves. Typically, the hydrocarbon component in the solvent mixture at least equals, and preferably exceeds, the weight of the cyanoalkylated product. It is thus preferred to employ only those solvent mixtures which consist of at least 50 weight percent of hydrocarbon solvent and up to 50 weight percent of co-solvent, basis weight of the solvent mixture.

To obtain maximum separation of the cyanoalkylated product from the poly-unsaturated nitrile, it is preferred to employ a ratio, in parts by weight, of hydrocarbon solvent to cyanoalkylated product of at least 2 to 1 and more, preferably of at least 3 to 1, when the hydrocarbon solvent is employed alone. When the hydrocarbon solvent is utilized in conjunction with a co-solvent it is preferred to employ a weight ratio of hydrocarbon solvent to cyanoalkylated product of from about 1 to 1 to about 5 to 1, and more preferably from about 1.5 to 1 to about 2.5 to 1.

Upon dissolution of the cyanoalkylated product in the hydrocarbon solvent or solvent mixture, the poly-unsaturated nitrile is precipitated as a solid. The solvent and precipitate are then separated by conventional methods, such as, decantation, centrifugation, filtration, and the like. If the poly-unsaturated nitrile precipitate is gelatinous or sticky, it is advisable to use a filter aid if filtration is employed as the means of separation. Magnesol (a commercial magnesium silicate), charcoal, kieselguhr, and other commercially available filter aids are suitable for this purpose.

Subsequent removal of the hydrocarbon solvent or solvent mixture by evaporation leaves the purified cyanoalkylated product typically as an almost colorless to colorless oil. The purified product can then be catalytically reduced to the corresponding primary amine with lower hydrogenating pressures and catalyst concentrations than those necessary for the unpurified product, particularly when hydrogenation is effected as described herein. Moreover, the catalyst remains active and can be re-used in subsequent hydrogenation reactions.

As indicated above, the beta-cyanoalkyl ether products are suitable for the production of the corresponding amine through reduction of the nitrile moieties thereof. Thus, the above discussion relating to the structure of the beta-cyanoalkyl ether products equally applies to the gamma-aminoalkyl ether derivative obtained by hydrogenation.

Such compounds may be more specifically characterized by the following formula:

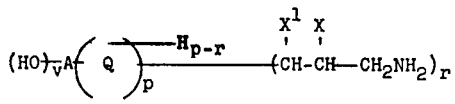

wherein A, Q, X, $X^1$, $v$, $p$ and $r$ are as described previously.

The gamma-aminoalkyl products of this invention are obtainable by conventional hydrogenation of the corresponding beta-cyanoalkyl products in such cases where the beta-cyanoalkyl products are in substantially pure state, e.g., as obtained from the aforedescribed purification process. However, there has been found a novel method by which hydrogenation of the beta-cyanoalkyl ether products may be gainfully effected even though the products contain substantial amounts of the polymerized nitrile impurity. This method has been found to significantly overcome the catalyst poisoning effect of the polymerized nitrile impurity. In addition, this novel hydrogenation method may be successfully employed in the hydrogenation of the "purified" beta-cyanoalkyl ether products obtainable by, e.g., the afore-described purification process.

It is known that some nitrile ethers are cleaved at the ether linkage during hydrogenation. The problem of cleavage is found to be exceedingly acute during hydrogenation of cyanoethylated polyoxyalkylene products such as bis-cyanoethylated polypropylene glycols having molecular weights between 200 and 2100. The hydrogenation of these compounds over nickel catalysts is invariably accompanied by appreciable cleavage when solvents containing easily detachable protons are employed. Attempted hydrogenation without a solvent or with a hydrocarbon solvent such as cyclohexane is, for the most part, unsatisfactory in that very little of the nitrile is reduced. Moreover, since purification by distillation of the 3-aminopropyl derivatives of polypropylene glycols having molecular weights greater than about 330 is found to be impractical due to their excessively high boiling points, it becomes important to devise methods to eliminate or substantially reduce cleavage and hence impurity formation, occurring during the reaction.

It is found that hydrogenation of beta-cyanoalkylated derivatives of polyoxyalkylene compounds may be effected with appreciable reduction in the cleavage problem and, in many cases, with complete elimination of the problem, by hydrogenating the nitriles in the presence of a tertiary amine and optionally, but preferably, in the further presence of anhydrous ammonia.

The effect of the amines in minimizing cleavage is unexpected inasmuch as these amines are bases which might be expected to promote the cleavage. In addition to the reduction of the cleavage problem these particular amines alone or with ammonia enhance the rapidity of the hydrogenation reaction and also allow for a reduction in hydrogenation pressures over those typically utilized with other solvent systems. Moreover, the hydrogenated product is substantially colorless or is only faintly colored.

The hydrogenation process of this invention is desirably effected by dissolving the beta-cyanoalkyl polyalkylene oxide products in a tertiary amine, with or without anhydrous ammonia, adding the hydrogenation catalyst and hydrogenating the mixture. Recovery and isolation of the amine reaction product is readily effected by filtering off the catalyst and thereafter stripping the solvent from the filtrate.

In practice, it is preferred to employ anhydrous ammonia in conjunction with the tertiary amine. It has been observed that the conjunctive use of anhydrous ammonia with the amine solvent system increases the purity of the reaction product. Moreover, it has been found that when anhydrous ammonia is used cleavage of the cyanoalkyl product is almost completely inhibited and the color of the resulting product is enhanced.

The advantages obtained by conducting the reaction in the presence of a tertiary amine will be apparent from a comparison of the reduction of alpha, omega-bis(2-cyanoethyl ether) of poly-1,2-propylene glycol in tertiary butanol with reductions in triethylamine as indicated in Table I which follows. Not only was the purity of the product superior when the tertiary amine was used but the hydrogenation proceeded more rapidly and at a lower pressure, that is, at about 1000 pounds per square inch gauge. The difference between the values quoted for total base content and primary amino nitrogen is a measure of the secondary amine present since only trace amounts of tertiary amine were found in the product.

TABLE I.—PREPARATION OF α,ω-BIS(3-AMINOPROPOXY)POLY-1,2-PROPYLENE GLYCOL BY REDUCTION OF α,ω-BIS(2-CYANOETHER) OF POLY-1,2-PROPYLENE GLYCOL

Effect of Solvent [a]

| Ex. | Solvent | Reaction temperature, °C. | Hydrogenating pressure, p.s.i.g. | Time required for uptake of hydrogen, mins. | Analyses of product[b] | |
|---|---|---|---|---|---|---|
| | | | | | Total-base content, meq./g. | Primary amino nitrogen, meq./g.[c] |
| 1 | t-Butanol | 120 | 1,000–2,000 | 210 | 0.706 | 0.601 |
| 2 | Triethylamine | 120 | 1,000–2,000 | 75 | 0.758 | 0.652 |
| 3 | do | 120 | 1,000 | 52 | 0.738 | 0.580 |
| 4 | t-Butanol | 110 | 1,000–2,000 | 85 | 0.152 | 0.141 |
| 5 | Triethylamine | 110 | 1,000 | 45 | 0.707 | 0.600 |

[a] Each experiment was done by hydrogenating a mixture of equal weights of α,ω-bis(2-cyanoethoxy)poly-1,2-propylene glycol having an approximate molecular weight of 2,131 and the indicated solvent with 15 weight percent of the total charge of a nickel on kieselguhr catalyst containing about 65 weight percent of nickel.

[b] α,ω-Bis(3-aminopropoxy)poly-1,2-propylene glycol has a calculated total-base content and primary amino nitrogen content of 0.935 meq./g.

[c] Determined by the method of F. E. Critchfield and J. B. Johnson, Anal. Chem., 29, 1,174 (1957).

The experimental data in Table II clearly illustrate the advantage of using ammonia in conjunction with tertiary amines. By operating in this fashion, the rate of hydrogenation is increased and the resulting product has improved color. When a hydrogenation pressure of from 1000 to 2000 pounds per square inch gauge is employed the product is improved from yellow to almost colorless. At pressures of from 950 to 1000 pounds per square inch gauge, the color is improved from green to pale straw.

TABLE II.—PREPARATION OF $\alpha,\omega$-BIS(3-AMINOPROPOXY) POLY-1,2-PROPYLENE GLYCOL BY REDUCTION OF $\alpha,\omega$-BIS(2-CYANOETHOXY)POLY-1,2-PROPYLENE GLYCOL [a]
Effect of Anhydrous Ammonia

| Ex. | Concentration of catalyst, wt. percent | Hydrogenating pressure, p.s.i.g. | Time required for uptake of hydrogen, mins. | Analyses of product [b] | |
|---|---|---|---|---|---|
| | | | | Total-base content, meq./g. | Primary amino nitrogen, meq./g. [c] |
| 1 | 15.0 | 1,000-2,000 | 75 | 0.758 | 0.652 |
| 2 [d] | 13.3 | 1,000-2,000 | 15 | 0.814 | 0.804 |
| 3 | 15.0 | 950-1,000 | 52 | 0.738 | 0.580 |
| 4 [e] | 12.9 | 950-1,000 | 4 | 0.854 | 0.841 |

[a] In each experiment a mixture of equal weights of $\alpha,\omega$-bis(cyanoethoxy) poly-1,2-propylene glycol having a molecular weight of 2,131 and triethylamine was hydrogenated at 120° C. in the presence of a nickel on kieselguhr catalyst.
[b] $\alpha,\omega$-Bis(3-aminopropoxy)poly-1,2-propylene glycol has a calculated total-base content and a primary amino nitrogen content of 0.935 meq./g.
[c] Determined by the method of F. E. Critchfield and J. B. Johnson, Anal. Chem., 29, 1174 (1957).
[d] Anhydrous ammonia added in an amount equal to one-quarter of the weight of the cyano-compound.
[e] Anhydrous ammonia added in an amount equal to one-third of the weight of the cyano-compound.

In general, the tertiary amines employed in the instant process encompass tertiary alkyl ar aryl amines and heterocyclic tertiary amines. In particular, amines having boiling points of below 250° C. at atmospheric pressure and not being easily susceptible to hydrogenolytic fission can be utilized.

The tertiary amines include those compounds characterized by the formulae:

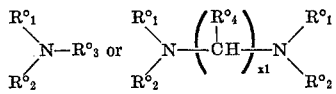

wherein $X^1$ is an integer of from 2 to 6, and $R°_1$, $R°_2$, and $R°_3$ may each represent alkyl groups containing from 1 to 8 carbon atoms, cycloalkyl groups containing from 4 to 8 carbon atoms, or phenyl groups, with the provision that the amines do not contain more than one phenyl group per molecule. $R°_4$ may be hydrogen or $R°_1$. The $R°$'s, particularly the $R°_4$'s, need not be the same throughout the molecule. Two of the $R°$'s, e.g., $R°_1$ and $R°_2$, $R°_1$ and $R°_3$, and $R°_1$ and $R°_1$, may be joined to form a divalent alkylene radical of from 2 to 10 carbon atoms.

Suitable tertiary amines which fulfill the aforementioned requirements include, among others, trimethylamine, triethylamine, tripropylamine, tri-n-butylamine, triamylamine, N,N,N',N''-tetramethyl-1,3-butanediamine, N,N-dimethylbutylamine, N,N-dimethylamylamine, N,N-dimethylethylamine, N,N-dimethylpropylamine, N,N-diethylpropylamine, N,N-diethylbutylamine, N,N-dipropylbutylamine, N,N-dimethylcyclohexylamine, N,N-diethylcyclohexylamine, pyridine, alpha-picoline, 3,5-lutidine, 2,4,6-collidine, N,N-dimethylaniline, N,N'-dimethylpiperazine and the like. Particularly preferred amines of the aforementioned group include triethylamine and pyridine.

The concentration of the amine in the reaction system is not necessarily critical and all that is needed is an amount sufficient to substantially inhibit cleavage of the cyanoalkylated compound during the reduction process. For practical purposes, the lowest effective weight concentration of the amine is about 5 percent, basis weight of the cyano-compound. Excessive cleavage typically occurs below this concentration. The upper limit of amine concentration will largely be determined by economic and other considerations. However, for most practical purposes an amine concentration, based on the weight of cyanoalkyl product, of from 10 to 50 percent is preferred. Table IV, which follows, illustrates the effect of the amine concentration.

TABLE IV.—PREPARATION OF $\alpha,\omega$-BIS(3-AMINOPROPOXY) POLY-1,2-PROPYLENE GLYCOL BY REDUCTION OF $\alpha,\omega$-BIS(2-CYANOETHOXY)POLY-1,2-PROPYLENE GLYCOL
Dependence of Purity of Product on Proportion of Triethylamine to Cyano-compound [a]

| Example | Proportion of triethylamine to cyano-compound, weight, percent | Analyses of product [b] | |
|---|---|---|---|
| | | Total-base content, meq./g. | Primary amino nitrogen, meq./g. |
| 1 | 50 | 0.854 | 0.841 |
| 2 | 10 | 0.831 | 0.812 |
| 3 | 5 | 0.750 | 0.738 |
| 4 | 0 | 0.710 | 0.698 |

[a] Each experiment was done by hydrogenating at 120° C. and 950 to 1,000 p.s.i.g. a mixture of $\alpha,\omega$-bis(2-cyanoethoxy)poly-1,2-propylene glycol having a molecular weight of 2,131, anhydrous ammonia and the nickel on kieselguhr catalyst in the respective amounts by weight of the cyano-compound of 25 and 30 percent. Triethylamine was also added except in Example 4.
[b] $\alpha,\omega$-Bis(3-aminopropoxy)poly-1,2-propylene glycol has a calculated total-base and primary amino nitrogen content of 0.935 meq./g.

Inasmuch as the catalytic reduction process of the present invention is influenced by other process variables, these will be considered in their relation to the preparation of the oxyalkylamines from the corresponding cyanoalkylated ether products.

The effectiveness of several hydrogenation catalysts was investigated to determine those most capable of effecting the reduction of the cyanoalkylated products under the conditions of the present invention. In practice, it was discovered that the nickel catalysts were the most suitable. Illustrative catalysts include, nickel, Raney nickel, supported nickel and supported nickel-containing catalysts. For example, supported nickel catalysts include among others, nickel on kieselguhr, nickel on fuller's TABLE V.—PREPARATION OF $\alpha,\omega$-BIS(3-AMINOPROPYLETHER) OF POLY-1,2-PROPYLENE GLYCOL BY REDUCTION OF $\alpha,\omega$-BIS(2-CYANOETHOXY)POLY-1,2-PROPYLENE GLYCOL
Effect of the Nature of the Catalyst on the Hydrogenation [a]

| Ex. | Catalyst | Hydrogenating pressure, p.s.i.g. | Time required for uptake of hydrogen, mins. | Analyses of product [b] | |
|---|---|---|---|---|---|
| | | | | Total-base content, meq./g. | Primary amino nitrogen, meq./g. |
| 1 | Raney nickel [c] | [d] 950-1,000 | 10 | 0.931 | 0.912 |
| 2 | Girdler G-49A | [d] 950-1,000 | 5 | 0.854 | 0.841 |
| 3 | Girdler T-323 [e] | [f] 950-1,000 | 45 | 0.712 | 1.678 |
| 4 | 5% Pd on C | [f] 1,000-2,000 | | 0.459 | 0.269 |

[a] Each experiment was done by hydrogenating at 120° C. a mixture of equal weights $\alpha,\omega$-bis(2-cyanoethoxy)poly-1,2-propylene glycol having a molecular weight of 2,131 and triethylamine with the catalyst in an amount equal to 30 weight percent of the cyano-compound. Anhydrous ammonia was also added.
[b] $\alpha,\omega$-Bis(3-aminopropoxy)poly-1,2-propylene glycol has a calculated total-base content and primary amino nitrogen content of 0.935 meq./g.
[c] Washed with anhydrous ethanol then with triethylamine.
[d] Anhydrous ammonia added in an amount equal to one-third of the weight of the cyano-compound.
[e] Cobalt on kieselguhr; Co content—50 percent by weight of the catalyst.
[f] Anhydrous ammonia added in an amount equal to one-quarter of the weight of the cyano-compound.

earth, nickel on clay, and the like. Preferred catalysts applicable for use in the present invention consist of reduced and stabilized nickel on a kieselguhr support, particularly those containing from about 50 to about 65 weight percent nickel. A particularly preferred catalyst consists of reduced and stabilized nickel on a kieselguhr support containing approximately 65 weight percent nickel. Other catalysts such as cobalt on kieselguhr and palladium on carbon, though useable, have not proven as effective as the above described catalysts.

Catalyst concentrations of from 3 to about 100 weight percent of the cyanoalkyl products can be employed to effect reduction. However, in order to maximize conversion to the amine, and obtain a product having a high degree of purity, concentrations within the range of from about 15 to about 30 weight percent are preferred. Concentrations above and below the aforementioned ranges can also be employed but are less preferred. Since the degree of reduction will be influenced by the particular choice and concentration of the catalyst, the desired operating conditions for one catalyst may not necessarily be the same for another.

Although reaction temperatures of from about 75° to 150° C. are possible, it is preferred to conduct the hydrogenation at temperatures within the range of from about 110° to about 130° C., and still more preferably from about 115° C. to about 125° C. While the hydrogenation reaction will proceed at temperatures above and below the aforementioned broad range, the purity of the product is likely to be lower.

In order to obtain satisfactory yields of the gamma-aminoalkyl ether products which have an acceptable degree of purity, hydrogenation pressures in excess of 120 pounds per square inch gauge are employed. Pressures in excess of 500 pounds per square inch gauge, and more preferably within the range of from about 950 to about 2000 pounds per square inch gauge have been found to provide enhanced conversion and maximum purity. The upper limit of the hydrogenating pressure will largely be determined by economic considerations.

Although the tertiary amine can be employed alone, the use of anhydrous ammonia in conjunction with the tertiary amine provides optimum conversion, maximum inhibition of cleavage, and results in a product which is essentially colorless or only faintly colored. The actual concentration of ammonia of course, will be in-part dependent upon the amount of the tertiary or heterocyclic amine present. However for practical purposes a concentration of anhydrous ammonia, based on the weight of cyano-product, of up to 33 weight percent and more, preferably up to 25 weight percent can be employed. When the hydrogenation reaction was conducted in the presence of anhydrous ammonia, but in the absence of a tertiary or heterocyclic amine, the purity of the product was low indicating possible cleavage at the ether linkage. It is therefore preferred to use the anhydrous ammonia only in conjunction with the tertiary amine.

The cyanoalkylated products should be neutralized by the addition of an equivalent quantity of a mineral acid, such as phosphoric acid to eliminate residual basic catalyst prior to reduction by the instant hydrogenation process. Cleavage of the nitrile will otherwise occur if the basic catalyst is not essentially eliminated.

The gamma-aminoalkyl ether products produced by the process of the instant invention are useful as components of polyurethane elastomers, polyurethane foams, flexible and rigid polyamide resins, epoxy resin hardeners, and the like.

The following enumerated examples merely illustrate operations of the inventions described herein and are not intended to limit the scope of the inventions in any manner. All percentages in these examples are by weight unless otherwise indicated.

EXAMPLE 1

The following illustrates the production of α-(2-cyanoethoxy)-ω-(n-butyl)poly-1,2-oxypropylene by the reaction of acrylonitrile with mono-n-butanol ether of poly-1,2-oxypropylene glycol, which monoether has an average molecular weight of 1200:

To 1500 grams of the aforesaid monoether covered by an atmosphere of nitrogen is added a 50 weight percent aqueous solution of NaOH. The resulting mixture is stirred and contains 0.28 weight percent water and 0.13 weight percent NaOH. 135.4 grams of acrylonitrile is fed to the mixture over a 2-hour period. The temperature of the mixture is maintained by occasional cooling at 25° C. to 30° C. The maximum degree of cyanoethylation as determined by infra-red analysis is achieved 3⅔ hours after all the acrylonitrile addition is completed. The mixture is neutralized by addition of 10.4 grams of 85 weight percent aqueous phosphoric acid. The neutralized mixture is evaporated at a temperature not exceeding 100° C. under progressively reduced pressure (from 200 to 20 millimeters Hg) until a residue is formed which no longer exhibits weight loss. Comparative infra-red scans show that cyanoethylation is 93 weight percent complete.

EXAMPLE 2

The following illustrates the purification of the cyanoethylated product produced in Example 1:

884 grams of the cyanoethylated product of Example 1 is dissolved in 3000 grams of anhydrous, sulfur-free heptane at 25° C. Within 60 minutes after solution, most of the polyacrylonitrile is determined to have settled out of solution, leaving a slightly hazy supernatant liquid. No further change in the solution is noted after standing overnight. The supernatant liquid is decanted and the remaining suspension of polyacrylonitrile is filtered through a kieselguhr-coated filter. The residue of polyacrylonitrile on the filter is washed with heptane. The washing is combined with the filtrate and added to the supernatant liquid. The liquid is stirred 5 minutes with the addition of 26.5 grams of Magnesol (magnesium silicate) and then filtered through a kieselguhr-coated filter to give a clear, colorless, filtrate. The filtrate is evaporated at a temperature not exceeding 100° C. under reduced pressure (from 200 to 20 millimeters Hg) to a constant weight. The resulting liquid product is shown by infra-red analysis to contain 93.4 weight percent α-(2-cyanoethoxy)-ω-(n-butyl)poly-1,2-oxypropylene.

EXAMPLE 3

The following illustrates the production of α,ω-bis(2-cyanoethoxy)-poly-1,2-oxybutylene by the reaction of acrylonitrile with poly-1,2-butylene glycol having an average molecular weight of 500:

1.0 gram of sodium methoxide is added to 1500 grams of poly-1,2-butylene glycol having an average molecular weight of 500. The glycol is covered by an atmosphere of nitrogen. The water content of the glycol, by the Karl Fisher method, is 0.067 weight percent and the sodium methoxide content of the glycol-sodium methoxide mixture by acidimetric titration is 0.053 weight percent. 558 grams of acrylonitrile is continuously added over two hours with stirring to the glycol-sodium methoxide mixture, the temperature of the reaction being kept between 25° C. to 30° C. by occasional cooling. 52 minutes after completion of acrylonitrile addition, it is noted from infra-red analysis that cyanoethylation is complete. The sodium methoxide is neutralized by the addition of 3 grams of 85 weight percent aqueous phosphoric acid. The product is stripped under reduced pressure with a kettle temperature not exceeding 100° C. to a constant weight. 96 weight percent of the residue consisted of cyanoethylated product.

EXAMPLE 4

The following illustrates the separation of the product produced in Example 3.

1000 grams of the cyanoethylated product of Example 3 is dissolved in 4000 grams of anhydrous, sulphur-free heptane at 25° C. Most of the polyacrylonitrile is found to settle out within 30 minutes from formation of the solution. There is no further change on standing overnight at 25° C. The solution is decanted and the remaining polyacrylonitrile suspension is filtered through a kieselguhr-coated filter. Filtration is found to be rapid, indicating a fairly large particle size for the polyacrylonitrile. The residue of polyacrylonitrile on the filter is washed once with heptane. The washing is combined with the filtrate and added to the decanted liquid. The whole liquid is stirred 15 minutes with 20 grams of Magnesol (magnesium silicate) at 25° C. and the mixture is filtered through a kieselguhr-coated filter to give a clear and colorless liquid. Evaporation to a constant weight of the filtrate under reduced pressure with a kettle temperature not exceeding 100° C. leaves 945 grams of a clear, almost colorless oil, which by infra-red analysis, contains 96.3 weight percent of the $\alpha,\omega$-bis(2-cyanoethoxy)-poly-1,2-oxybutylene.

EXAMPLE 5

The following illustrates the preparation of $\alpha,\omega$-bis-(2-cyanoethoxy)-poly-1,2-oxybutylene from the reaction of acrylonitrile with poly-1,2-butylene glycol having an average molecular weight of 1000. The procedure of Example 3 is followed, using the following different amounts of ingredients:

| Ingredient: | Amount in grams |
| --- | --- |
| Sodium methoxide | 1.0 |
| 1000 M.W. poly-1,2-butylene glycol | 1500.0 |
| Acrylonitrile | 312.5 |
| 85 weight percent aqueous phosphoric acid | 3.2 |

The obtained residue product exhibits 96.6 weight percent cyanoethylated product. When the residue product is treated according to the proedure described in Example 4, there is obtained 839 grams of a clear, pale-straw oil which, from infra-red analysis, contains 95.7 weight percent of the $\alpha,\omega$-bis(2-cyanoethoxy)-poly-1,2-oxybutylene.

EXAMPLE 6

The following illustrates the preparation of $\alpha,\omega$-bis(2-cyanoethoxy)-poly-1,2-oxybutylene from the reaction of acrylonitrile with poly-1,2-butylene glycol having an average molecular weight of 2,000:

The procedure described in Example 3 is employed using the following different amounts of ingredients:

| Ingredient: | Amount in grams |
| --- | --- |
| Sodium methoxide | 1.0 |
| 2000 M.W. poly-1,2-butylene glycol | 1500.0 |
| Acrylonitrile | 159.0 |
| 85 weight percent aqueous phosphoric acid | 3.2 |

The obtained residue product contains 92.9 weight percent cyanoethylated product. When the residue product is treated according to the procedure described in Example 4, there is obtained 914.0 grams of a pale-yellow oil which, from infra-red analysis, comprises 92.5 weight percent of the $\alpha,\omega$-bis(2-cyanoethoxy)poly-1,2-oxybutylene. It is to be noted that in the purification of the residue product according to the procedure of Example 4, little polyacrylonitrile settles from the heptane solution. Accordingly, filtration through the kieselguhr-coated filter is achieved with some difficulty. However, mixture of the filtrate with Magnesol allows ready filtration.

EXAMPLE 7

The following illustrates the production of $\alpha,\omega$-bis(2-cyanoethoxy)-poly-1,2-oxypropylene by the reaction of acrylonitrile with poly-1,2-propylene glycol having an average molecular weight of 1025:

212.2 grams of acrylonitrile is added over two hours with stirring to a mixture of 1103.0 grams of poly-1,2-propylene glycol having an average molecular weight of 1025 and 5.5 grams of aqueous 20 weight percent sodium hydroxide covered by an atmosphere of nitrogen. The exothermic reaction is kept between 25° C. and 30° C. by occasional cooling. The reaction is noted to be complete through infra-red analysis about four hours after completion of acrylonitrile addition. The sodium hydroxide is neutralized by addition of 2.0 grams of aqueous 85 weight percent phosphoric acid. Excess of acrylonitrile and traces of water are removed by stripping the product to a constant weight under reduced pressure with a kettle temperature not exceeding 100° C. There remains a hazy yellow oil.

A 500 gram portion of this oil is stirred 30 minutes at 50° C. with 50.0 grams of Magnesol and then is filtered through a kieselguhr-coated filter to obtain a clear, almost colorless filtrate which is evaporated under reduced pressure at a temperature not exceeding 100° C. until the residue no longer loses weight. There remains an almost colorless oil which by infra-red analysis contains 96.4 weight percent of the $\alpha,\omega$-bis(2-cyanoethoxy)poly-1,2-oxypropylene.

EXAMPLE 8

The following illustrates production of $\alpha,\omega$-bis(2-cyanoethoxy)-poly-1,2-oxypropylene by the reaction of acrylonitrile with poly-1,2-oxypropylene glycol having an average molecular weight of 2025:

The procedure described in Example 7 is employed using the following different amounts of ingredients:

| Ingredients: | Amounts in grams |
| --- | --- |
| Acrylonitrile | 638.8 |
| Poly-1,2-oxypropylene glycol 2025 M.W. | 6075.0 |
| Aqueous 20 weight percent NaOH | 30.0 |
| Aqueous 85 weight percent phosphoric acid | 10.8 |

The product obtained is a clear, almost colorless oil containing 94 weight percent of the $\alpha,\omega$-bis(2-cyanoethoxy)-poly-1,2-oxypropylene.

EXAMPLE 9

The following illustrates the production of 1,2,6-tris-[$\alpha$-(2-cyanoethoxy)-poly-1,2-oxypropyl]hexane by the reaction of acrylonitrile with the triol formed from the oxypropylation of 1,2,6-hexanetriol, which triol has an average molecular weight of 4950 and a hydroxyl number of 34.

79.6 grams of acrylonitrile are added over two hours with stirring to a mixture of 1,298 grams of the triol and 3.8 grams of aqueous 20 weight percent NaOH covered by an atmosphere of nitrogen gas. The reaction, which is exothermic, is kept between 25° C. and 30° C. by occasional cooling. The reaction is noted to be complete through infra-red analysis about 4¾ hours after completing addition of the acrylonitrile. The NaOH is neutralized by addition of 1.4 grams of aqueous 85 weight percent phosphoric acid. Excess of acrylonitrile and water are removed by stripping the product to a constant weight under reduced pressure with a kettle temperature not exceeding 100° C., resulting in a hazy yellow oil. 500 grams of the oil are stirred for 30 minutes at 50° C. with 50.0 grams of magnesol and then filtered through a kieselguhr-coated filter. The filtrate is a clear, colorless oil containing 92 weight percent of the 1,2,6-tris [$\alpha$-(2-cyanoethoxy)-poly-1,2-oxypropylene]hexane.

EXAMPLE 10

The following illustrates the production of 1,2,3-tris-[$\alpha$-(2-cyanoethoxy)-poly-1,2-oxypropyl]propane by the reaction of acrylonitrile with the triol formed by the oxypropylation of glycerine, which triol has an average molecular weight of 3000 and a hydroxyl number of 56:

The procedure described in Example 9 is employed using the following different amounts of ingredients:

| Ingredients: | Amounts in grams |
|---|---|
| Acryonitrile | 159.2 |
| Aqueous 20 weight percent NaOH | 7.5 |
| Triol | 1480.0 |
| Aqueous 85 weight percent phosphoric acid | 2.7 |

There is obtained a hazy yellow oil, infra-red examination of which indicates 91 percent cyanoethylation of the starting triol to 1,2,3-tris[α-(2-cyanoethoxy)-poly-1,2-oxypropyl]propane.

EXAMPLE 11

The following illustrates the production of α,ω-bis(2-cyanoethoxy)-poly - 1,2 - oxypropylene-1,4-oxybutylene (50/50) by the reaction of acrylonitrile with a copolymer glycol of 50 mol percent 1,2-oxypropylene and 50 mol percent 1,4-oxybutylene, which glycol has an average molecular weight of 1500 and a hydroxyl number of 45:

To a mixture of 250 grams of the glycol and 0.8 grams of sodium methoxide there is added with stirring over a two hour period 21.2 grams of acrylonitrile. The reaction temperature is maintained between 25° C. and 30° C. by occasional cooling. Maximum cyanoethylation as determined by infra-red analysis is achieved 25 minutes after termination of acrylonitrile addition. The mixture is neutralized by addition of 2.6 grams of aqueous 85 weight percent phosphoric acid. The neutralized mixture is evaporated to a constant weight at a temperature not exceeding 100° C. under progressively reduced pressure (from 200 to 20 millimeters Hg). Comparative infra-red scans shows that cyanoethylation is 95.6 weight percent complete.

EXAMPLE 12

The following illustrates the preparation of tris(2-cyanoethyl) - ether of oxypropylated tris(4 - hydroxyphenyl)propane by the reaction of acrylonitrile with the triol formed by oxypropylating a mixture of 1,1,3- and 1,1,2-tris(4-hydroxyphenyl propane, which triol has a hydroxyl number of 259 and an average molecular weight of 650.

1,500 grams of the triol is dissolved in 500 grams of pyridine and 7.5 grams of aqueous 20 weight percent sodium hydroxide is mixed therewith. The pyridine acts as a solvent for the viscous triol. A nitrogen gas atmosphere is maintained over the mixture. 735 grams of acrylonitrile is stirred into the mixture over a two-hour addition period. The reaction temperature through occasional cooling is maintained between 25° C. and 30° C. The maximum degree of cyanoethylation is noted from infra-red analysis to occur 3 hours after completion of acrylonitrile addition. The NaOH is neutralized by the addition of 6.5 grams of aqueous 85 weight percent phosphoric acid. Pyridine, water and excess acrylonitrile are removed by stripping the product until a constant weight is achieved under reduced pressure with a kettle temperature not exceeding 100° C. The residue product is a pale brown, viscous oil and, from infra-red analysis, exhibits complete cyanoethylation.

EXAMPLE 13

The following illustrates the preparation of hexa-[α-(2-cyanoethoxy)-poly-1,2-oxypropyl]hexane by reaction of acrylonitrile with the hexol formed by the oxypropylation of sorbitol, which hexol has a hydroxyl number of 509.6 and an average molecular weight of 660.

The procedure described in Example 12 is employed using the following different amounts of ingredients:

| Ingredients: | Amounts in grams |
|---|---|
| Hexol | 1,983 |
| Acrylonitrile | 972 |
| Pyridine | 300 |
| Aqueous 20 weight percent NaOH | 8.0 |
| Aqueous 85 weight percent $H_3PO_4$ | 8.6 |

The residue product is a pale brown, viscous oil and, from infra-red analysis, exhibits complete cyanoethylation.

EXAMPLES 14–52

To demonstrate the effectiveness of the solvent purification process, four grams of the cyanoethylated product is dissolved in the solvent or solvent mixtures indicated in Table VI below. The whole is then centrifuged. When the hydrocarbon solvent or solvent mixture is satisfactory, polyacrylonitrile readily separates and quickly settles to the bottom of the centrifuge tube leaving a homogeneous clear and colorless, supernatant liquid.

The treated products are the dicyanoethylated derivatives of polypropylene glycols which have molecular weights of 425, 1025 and 2025 and which are designated in Table VI as compounds A, B, and C respectively. These products are made by the process described in Examples 7 and 8.

TABLE VI.—PURIFICATION OF CYANOETHYLATED COMPOUNDS BY HYDROCARBON SOLVENTS AND SOLVENT MIXTURES

| Ex. | Compound | Pentane, wt., gms. | Hexane, wt., gms. | Heptane, wt., gms. | Octane, wt., gms. | Cosolvent | gms. | Rating[a] |
|---|---|---|---|---|---|---|---|---|
| 14 | A | | | | 20 | | 2 | 5 |
| 15 | A | | | | 20 | Ethyl acetate | 2 | 2 |
| 16 | B | | | 6 | | n-Butyl ether | 2 | 1 |
| 17 | B | | | 7 | | Ethyl acetate | 2 | 2 |
| 18 | B | | | 6 | | Ethyl formate | 2 | 3 |
| 19 | B | | | | 6 | do | 2 | 3 |
| 20 | B | | 6 | | | Xylene | 6 | 5 |
| 21 | B | | 6 | | | do | 2 | 3 |
| 22 | B | | 6 | | | Cyclohexane | 2 | 1 |
| 23 | B | | | | | do | 20 | 1 |
| 24 | B | | | | | Methyl cyclohexane | 16 | 2 |
| 25 | B | | | 10 | | Anisole | 2 | 3 |
| 26 | B | | 9 | | | Diethyl acetal | 2 | 2 |
| 27 | B | | 9 | | | Ethyl acetate | 1.8 | 1 |
| 28 | B | | 9 | | | Methyl ethyl ketone | 1.6 | 2 |
| 29 | B | | 8 | | | Carbon tetrachloride | 2 | 2 |
| 30 | B | | 8 | | | N-Butyl ether | 1.4 | 1 |
| 31 | B | | 6 | | | Ethyl formate | 1 | 3 |
| 32 | B | | 6 | | | do | 2.2 | 3 |
| 33 | B | | 8 | | | Ethyl propionate | 1.6 | 2 |
| 34 | B | | 8 | | | Tetrahydrofuran | 1.7 | 1 |
| 35 | B | | 6 | | | Acetone | 2.3 | 2 |
| 36 | B | | 6 | | | Chloroform | 1 | 3 |
| 37 | B | | 6 | | | do | 2 | 3 |
| 38 | B | | 6 | | | Isopropyl ether | 2.5 | 2 |
| 39 | B | | 6 | | | do | 1.6 | 3 |
| 40 | B | | 7 | | | Ethyl carbonate | 4 | 3 |
| 41 | B | | 6 | | | Triethylamine | 1.6 | 2 |
| 42 | B | | 9 | | | t-Butanol | 2 | 2 |
| 43 | B | | 6 | | | do | 2 | 3 |
| 44 | B | | 9 | | | Isopropyl alcohol | 2 | 2 |
| 45 | B | | 7 | | | do | 2 | 3 |
| 46 | B | 9 | | | | Ethyl acetate | 1.8 | 1 |
| 47 | B | 8 | | | | Butyl ether | 3.2 | 1 |
| 48 | B | 6 | | | | Ethyl formate | 2 | 3 |

See footnote at end of table.

TABLE VI—Continued

| Ex. | Compound | Pentane, wt., gms. | Hexane, wt., gms. | Heptane, wt., gms. | Octane, wt., gms. | Cosolvent | gms. | Rating a |
|---|---|---|---|---|---|---|---|---|
| 49 | C | | | | 6 | Ethyl acetate | 1 | 3 |
| 50 | C | | | | | {Nonane / Ethyl acetate} | 6 / 1 | 3 |
| 51 | C | | | | 7 | Butyl ether | 2 | 2 |
| 52 | C | | 7 | | | do | 2 | 2 | a 1=Excellent separation of polyacrylonitrile; 2=Good separation of polyacrylonitrile; 3=Fair separation of polyacrylonitrile; 4=Poor separation of polyacrylonitrile; 5=No separation of polyacrylonitrile. Purification method failed.

EXAMPLE 53

220 grams of the residue product obtained by treating a polypropylene glycol having an average molecular weight of about 425 with acrylonitrile in the presence of a basic catalyst, in accordance with the procedures of Examples 7 and 8, is dissolved at 25° C. in a mixture of 220 grams of commercial, sulphur-free hexane and 220 grams of anhydrous diethyl ether. A yellow, flocculent precipitate of polyacrylonitrile rapidly separates. The mixture is stirred for 15 minutes with 11.0 grams of Magnesol and then is filtered through a kieselguhr-coated filter. The filtrate is homogeneous, clear, and almost colorless. It is evaporated first at atmospheric then under reduced pressure at a temperature below 100° C. until the residue no longer loses weight. There remains a clear, light-yellow oil. The original product is yellow and opaque.

1400 grams of the purified cyanoethylated derivative, 1400 grams of isopropyl alcohol and Raney nickel (233.3 g. of aqueous sludge washed four times with isopropyl alcohol before use) are introduced into a 2-gallon, stainless steel autoclave provided with a stirrer. The free space is purged of air with hydrogen, 350 grams of anhydrous ammonia is added, and then the pressure in the autoclave is increased to 300 pounds per square inch gauge, by the addition of hydrogen.

The mixture is heated to 120° C. whereupon the pressure is further increased to 1000 pounds per square inch gauge, by the addition of more hydrogen. The temperature is kept at 120° C. and the hydrogenating pressure at 950 to 1000 pounds per square inch gauge until uptake of hydrogen has ceased (75 minutes) and thereafter for 30 minutes.

After removal of the catalyst by filtration, the reaction product is evaporated first at atmospheric then under reduced pressure at a temperature below 100° C. until the residue no longer loses weight. Bis(3-aminopropyl) ether of poly-1,2-propylene glycol remains as a clear, straw-colored oil having a faint ammoniacal odor. The product has a total alkalinity of 3.57 milliequivalents per gram and it contains 3.50 milliequivalents per gram of primary amino nitrogen. Based on its primary amino nitrogen content, the diamine has a purity of about 95 percent.

When original cyanoethylated derivative prior to solvent treatment is treated with hydrogen under the same conditions as the purified derivative but with a reaction time of 75 minutes (there is no evident uptake of hydrogen) the reaction product, after working up as before, is a light brown oil. It has a total alkalinity of 1.515 milliequivalents per gram and it contains 1.445 milliequivalents per gram of primary amino nitrogen. Furthermore, analysis shows that the product contains 2.215 milliequivalents per gram of nitrile groups which indicates that about 60 percent of the original nitrile groups have not been reduced.

EXAMPLE 54

1000 grams of the residue product obtained by treating a polypropylene glycol having a molecular weight of about 1025 with acrylonitrile in the presence of a basic catalyst as shown in Example 7 is dissolved at 25° C. in a mixture of 1680 grams of commercial sulphur-free hexane and 400 grams anhydrous diethyl ether. A yellow, flocculent precipitate of polyacrylonitrile separates. The mixture is stirred for 15 minutes with 50 grams of Magnesol (a commercial magnesium silicate) and then is filtered through a kieselguhr-coated filter. The filtrate is homogeneous, clear, and colorless. It is evaporated first at atmospheric then under reduced pressure with a kettle temperature not exceeding 100° C. until the residue no longer loses weight. There remains a clear and colorless oil. The original product is yellow and opaque.

300.0 grams of the purified cyanoethylated derivative, 300.0 grams of triethylamine, and 30.0 grams of Girdler G–94A catalyst [1] are introduced into a 1-gallon, stainless steel autoclave fitted with a stirred. The free space is purged of air with hydrogen, 75 grams anhydrous ammonia is added, and then the pressure in the autoclave is increased to 300 pounds per square inch gauge by the addition of hydrogen. The mixture is heated to 120° C. whereupon the pressure is further increased to 1000 pounds per square inch gauge by the addition of more hydrogen. The temperature is kept at 120° C. and the hydrogenating pressure at 950 to 1000 pounds per square inch gauge until uptake of hydrogen ceases, about 10 minutes, and thereafter for 30 minutes. After removal of the catalyst by filtration, the reaction product is evaporated first at atmospheric then under reduced pressure at a temperature below 100° C. until the residue no longer loses weight. The reaction product remains as an almost colorless oil having a faint ammoniacal odor. It has a total alkalinity of 1.279 milliequivalents per gram and it contains 1.257 milliequivalents per gram of primary amino nitrogen. Based on the primary amino nitrogen content the diamine has a purity of about 76 percent.

When the original cyanoethylated derivative is treated with hydrogen under the same conditions as the purified derivative but with a reaction time of 1 hour 45 minutes the reaction product, after working up as before, is a yellow oil. It has a total-alkalinity of 0.496 milliequivalent per gram and it contains 0.340 milliequivalent per gram of primary amino nitrogen. Furthermore, analysis shows the product to contain 1.287 milliequivalents per gram of nitrile group which indicates that about 78 percent of the original nitrile groups have not been reduced.

EXAMPLE 55

1245 grams of the residue product obtained by treating a polypropylene glycol having a molecular weight of about 2025 with acrylonitrile in the presence of a basic catalyst, as shown in Example 8, is dissolved at 25° C. in 4,980 milliliters of commercial, sulphur-free hexane. A yellow-orange flocculent precipitate of polyacrylonitrile separates. The mixture is allowed to settle overnight; then the clear, faintly yellow supernatant liquor is filtered through paper. After being stirred at 25° C. for 30 minutes with 62.3 grams of Magnesol the filtrate is filtered through a kieselguhr-coated filter. The filtrate from this last operation is colorless; it is evaporated first at atmospheric then under reduced pressure at a temperature below 80° C. until the residue no longer loses weight. There remains a clear, colorless and viscous liquid. The original crude product is orange and opaque.

400.0 grams of the purified cyanoethylated derivative, 400.0 grams of triethylamine and 40.0 grams of Girdler G–49A catalyst are introduced into a one-gallon, stainless steel autoclave fitted with a stirrer. The free space is purged of air with hydrogen after which the mixture is heated to 120° C. and the pressure increased to 150 pounds per square inch gauge by the addition of hydrogen.

---
[1] A nickel on kieselguhr catalyst containing 65 weight percent of nickel.

The temperature is kept at 120° C. and the hydrogenating pressure at 140 to 150 pounds per square inch gauge until uptake of hydrogen has ceased, about 15 minutes, and thereafter for 30 minutes. After removal of the catalyst by filtration, the reaction product is evaporated first at atmospheric pressure then under reduced pressure at a temperature below 100° C. until the residue no longer loses weight. α,ω-bis(3-aminopropoxy)-poly-1,2-oxypropylene remains as a light brown oil having a faint ammoniacal odor. It has a total-alkalinity of 0.801 milliequivalent per gram and it contains 0.601 milliequivalent per gram of primary amino nitrogen. Based on its primary amino nitrogen content, the diamine has a purity of about 65 percent.

When the original cyanoethylated derivative is treated with hydrogen under the same conditions as the purified derivative the reaction product, after working up as before, is a light greenish-brown oil. It has a total-alkalinity of 0.27 milliequivalent per gram and it contains 0.265 milliequivalent per gram of primary amino nitrogen. Furthermore, analysis shows the product to contain 0.60 milliequivalent per gram of nitrile groups which indicates that about 64 percent of the original nitrile groups have not been reduced.

EXAMPLE 56

330.0 grams of the purified cyanoethylated derivative of Example 55, 330 grams isopropyl alcohol, and 55.0 grams of Raney nickel (aqueous sludge, washed four times with isopropyl alcohol before use) are introduced into a one-gallon, stainless steel autoclave provided with a stirrer. The free space is purged of air with hydrogen, 82.5 grams of anhydrous ammonia is added, and then the pressure in the autoclave is increased to 300 pounds per square inch gauge by the addition of hydrogen. The mixture is heated to 120° C. whereupon the pressure is further increased to 1000 pounds per square inch gauge by the addition of more hydrogen. The temperature is kept at 120° C. and the hydrogenating pressure at 950 to 1000 pounds per square inch gauge until uptake of hydrogen ceases, about 45 minutes, and thereafter for 30 minutes. Working up of the product as in the previous example affords the α,ω-bis(3-aminopropyl)ether of poly-1,2-propylene glycol as a colorless oil. It has a total alkalinity of 0.884 milliequivalent per gram and contains 0.880 milliequivalent per gram of primary amino nitrogen. Based on its primary amino nitrogen content, the diamine has a purity of about 94 percent.

When the original cyanoethylated derivative is treated with hydrogen under the same conditions as the purified derivative, the reaction product, after working up as before, is an orange oil. It has a total-alkalinity of 0.250 milliequivalent per gram and contains 0.227 milliequivalent per gram of primary amino nitrogen. Furthermore, analysis shows that the product contains 0.737 milliequivalent per gram of nitrile groups which indicates that about 79 percent of the original nitrile groups have not been reduced.

EXAMPLE 57

500 grams of a residue product, obtained by cyanoethylation as illustrated in Example 10 of a triol made by the oxypropylation of glycerol and having a hydroxyl number of 56, is dissolved at 25° C. in 2000 cc. of commercial hexane. Polyacrylonitrile separates as a flocculent yellow precipitate. The mixture is allowed to settle overnight; then the clear supernatant liquid is decanted from the polyacrylonitrile and stirred for 15 minutes with 25 grams of Magnesol. The Magnesol is removed by filtration through a kieselguhr-coated filter and the colorless filtrate is evaporated to a constant weight first at atmospheric then under reduced pressure at a temperature not exceeding 80° C. There remains a clear and colorless oil. The original crude product is yellow and opaque.

300.0 grams of the purified cyanoethylated derivative, 300.0 grams of isopropyl alcohol, and 50.0 grams of Raney nickel (aqueous sludge, washed four times with isopropyl alcohol before use) are introduced into a 1-gallon, stainless steel autoclave provided with a stirrer. The free space is purged of air with hydrogen, 75 grams of anhydrous ammonia are added, and then the pressure in the autoclave is increased to 300 pounds per square inch gauge by the addition of hydrogen. The mixture is heated to 120° C. whereupon the pressure is further increased to 1000 pounds per square inch gauge by the addition of more hydrogen. The temperature is kept at 120° C. and the hydrogenating pressure at 950 to 1000 pounds per square inch gauge until uptake of hydrogen ceases, about 15 minutes, and thereafter for 30 minutes. After removal of the catalyst by filtration, the reaction product is evaporated to a constant weight first at atmospheric then under reduced pressure at a temperature below 100° C. Tris(3-aminopropyl)ether of polyoxypropylglycerol remains as a clear and colorless oil having a faint ammoniacal odor. It has a total alkalinity of 0.854 milliequivalent per gram and contains 0.844 milliequivalent per gram of primary amino nitrogen. Based on the primary amino nitrogen content, the triamine has a purity of 88 percent.

When the original cyanoethylated derivative is treated with hydrogen under the same conditions as the purified derivative but with a reaction time of one hour the reaction product, after working up as before, is a yellow-brown oil. It has a total-alkalinity of 0.258 milliequivalent per gram and it contains 0.231 milliequivalent per gram of primary amino nitrogen. Furthermore, analysis shows that the product contains 0.690 milliequivalent per gram of nitrile groups which indicates that 72.1 percent of the original nitrile groups have not been reduced.

EXAMPLE 58

500 grams of the hazy yellow oil of Example 9 is dissolved at 25° C. in 2000 cc. of commercial, sulphur-free hexane.

The mixture is stirred for 15 minutes with 25 grams of Magnesol and then filtered through a kieselguhr-coated filter This operation is then repeated. The final filtrate is homogeneous, clear, and very pale yellow. It is evaporated to a constant weight first at atmospheric then under reduced pressure at a temperature below 100° C. There remains a clear, yellow oil.

EXAMPLE 59

487.7 grams of the residue product obtained by treating the monobutyl ether of polypropylene glycol [2] with acrylonitrile in the presence of a basic catalyst as described in Example 1 is dissolved in 1463.1 grams of anhydrous, sulfur-free heptane. The mixture is stirred for 15 minutes at room temperature (25° C.) with 14.6 grams of Magnesol and then filtered through a kieselguhr coated filter. Filtration is easy and rapid. The clear, almost colorless filtrate is evaporated to a constant weight under reduced pressure with a kettle temperature below 100° C. There remains 454.3 grams of a clear, yellow oil which appears by infra-red, analysis to be cyanoethylated to the extent of 96.3 percent.

EXAMPLE 60

250 grams of alpha, omega-bis(2-cyanoethoxy)poly-1,2-oxypropylene, characterized by an average molecular weight of 2131 and having a purity of 94 percent, 250 grams of triethylamine, and 75.0 grams of a reduced and stabilized nickel on kieselguhr catalyst (65 weight percent nickel) are introduced into a three liter, stainless steel autoclave equipped with a stirring device. The free space ---
[2] The monobutyl ether of polypropylene glycol has the formula:

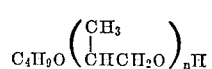

wherein $n =$ approximately 6.2.

is purged of air with hydrogen, 62.5 grams of anhydrous ammonia added, and the pressure in the autoclave increased to 300 pounds per square inch gauge by the addition of hydrogen. Thereafter, the mixture is heated to 120° C. whereupon the pressure is further increased to 1000 pounds per square inch gauge by the addition of more hydrogen. During the reaction the pressure is maintained at 120° C. and the hydrogenating pressure at 950 to 1000 pounds per square inch gauge until uptake of hydrogen ceases and thereafter for an additional thirty minutes.

After removal of the catalyst by filtration, the reaction product is evaporated to a constant weight first at atmospheric pressure, then under a reduced pressure at a temperature below 100° C. The resulting alpha, omega-bis-(3-aminopropyl)poly-1,2-propylene glycol having a molecular weight of approximately 2139 remains as a colorless oil having a faint ammoniacal odor. The product has a total alkalinity of 0.854 milliequivalent per gram and contains 0.841 milliequivalent per gram of primary amino nitrogen, as determined by the method of F. E. Critchfield and J. B. Johnson, Anal, Chem., 29 1174 (1957).

EXAMPLE 61

The procedure employed in Example 60 is repeated except that the quantity of triethylamine employed is reduced to one-tenth of the weight of the alpha, omega-bis(2-cyanoethoxy)poly-1,2-oxypropylene. The resulting alpha, omega-bis(3-aminopropoxy)poly-1,2-oxypropylene is a colorless oil. It has a total-alkalinity of 0.831 milliequivalent per gram and contains 0.812 milliequivalent per gram of primary amino nitrogen.

EXAMPLE 62

The procedure employed in Example 60 is repeated in the absence of the anhydrous ammonia. The resulting alpha, omega-bis(3-aminopropoxy)poly-1,2-oxypropylene is an apple-green oil. The product has a total alkalinity of 0.738 milliequivalent per gram and contains 0.580 milliequivalent per gram of primary amino nitrogen.

EXAMPLE 63

316 grams of alpha, omega-bis(2-cyanoethoxy)poly-1,2-oxy-propylene, having an average molecular weight of 2135 and a purity of 94 percent, 316 grams of triethylamine, and 94.8 grams of commercial Raney nickel (which has been washed first with anhydrous ethanol then with triethylamine) are introduced into a three-liter stainless steel autoclave equipped with a stirring device. The free space is purged of air with hydrogen, 106 grams of anhydrous ammonia added, and the pressure in the autoclave is increased to 300 pounds per square inch gauge by the addition of hydrogen. The mixture is then heated to 120° C. whereupon the pressure is further increased to 1000 pounds per square inch gauge by the addition of more hydrogen. The temperature is maintained at 120° C. and the hydrogenating pressure at 950 to 1000 pounds per square inch gauge until uptake of hydrogen ceases and thereafter for 30 minutes.

After removal of the catalyst by filtration, the reaction product is evaporated to a constant weight first at atmospheric pressure then under a reduced pressure at a temperature below 100° C. The resulting alpha, omega-bis(3-aminopropoxy)poly-1,2-oxypropylene remains as an almost colorless oil having a faint ammoniacal odor. The product has a total-alkalinity of 0.931 milliequivalent per gram and contains 0.912 milliequivalent per gram of primary amino nitrogen.

EXAMPLE 64

The procedure employed in Example 60 is repeated except that an equal weight of reduced and stabilized cobalt on kieselguhr catalyst (containing about 50 percent cobalt) was substituted for the nickel on kiesselguhr catalyst. The alpha, omega-bis (3-aminopropoxy)poly-1,2-oxypropylene produced is a straw-colored oil which has a total alkalinity of 0.712 milliequivalent per gram and contains 0.678 milliequivalent per gram of primary amino nitrogen.

EXAMPLE 65

The procedure employed in Example 60 is repeated except that an equal weight of pyridine is substituted for the triethylamine. The alpha, omega-bis(3-aminopropoxy)poly-1,2-oxypropylene produced is a pale-yellow oil. The product has a total-alkalinity of 0.857 milliequivalent per gram and contains 0.838 milliequivalent per gram of primary amino nitrogen.

EXAMPLE 66

The procedure employed in Example 60 is repeated except that an equal weight of N,N,N',N'-tetramethyl-1,3-butanediamine is substituted for the triethylamine. The alpha, omega-bis(3-aminopropyl)ether of poly-1,2-propylene glycol produced is a pale, straw-colored oil. The product has a total-alkalinity of 0.840 milliequivalent per gram and contains 0.791 milliequivalent per gram of primary amino nitrogen.

EXAMPLE 67

The procedure employed in Example 60 is repeated except that an equal weight of tri-n-butylamine is substituted for the triethylamine. The resulting alpha, omega-bis (3-aminopropyl)ether of poly-1,2-propylene glycol having an average molecular weight of 2139 is produced as a pale-yellow oil. The product has a total-alkalinity of 0.925 milliequivalent per gram and it contains 0.751 milliequivalent per gram of primary amino nitrogen.

EXAMPLE 68

The procedure employed in Example 60 is repeated except that an equal weight of N,N-dimethylaniline is substituted for the triethylamine. The resulting alpha, omega - bis(3-aminopropoxy)poly-1,2-oxypropylene having an average molecular weight of 2139 is a pale-straw colored oil. The product has a total-alkalinity of 1.095 milliequivalents per gram and contains 0.817 milliequivalent per gram of primary amino nitrogen.

EXAMPLE 69

Tricyanoethylated polyoxypropyl-1,2,6-trihydroxyhexane (having a purity of about 92 percent and obtained by cyanoethylation of a triol having a hydroxyl number of 34 made by oxypropylation of 1,2,6-trihydroxyhexane) as shown in Examples 9 and 58 is hydrogenated according to the procedure given in Example 60. After removal of the catalyst by filtration, the reaction product is evaporated to a constant weight first at atmospheric then under reduced pressure at a temperature below 100° C. Tris(3 - aminopropoxy) polyoxypropyl - 1,2,6-trihydroxyhexane remains as an almost colorless oil having a faint ammoniacal odor. The product has a total-alkalinity of 0.482 milliequivalent per gram and contains 0.458 milliequivalent per gram of primary amino nitrogen. Based on the primary amino nitrogen content the triamine has a purity of 82.0 percent.

EXAMPLE 70

Tricyanoethylated polyoxypropylglycerol (having a purity of about 91 percent and obtained by cyanoethylation of a triol having a hydroxyl number of 56 made by oxypropylation of glycerol) is hydrogenated according to the procedure given in Example 60. After removal of the catalyst by filtration, the reaction product is evaporated to a constant weight first at atmospheric then under reduced pressure at a temperature below 100° C. Tris(3-aminopropyl)ether of polyoxypropylglycerol remains as an almost colorless oil having a faint ammoniacal odor. The product has a total-alkalinity of 0.845 milliequivalent per gram and contains 0.825 milliequivalent per gram of primary amino nitrogen. Based on the primary amino nitrogen content the triamine has a purity of 83.5 percent.

EXAMPLE 71

Tricyanoethylated polyoxypropylglycerol (having a purity of about 91 percent and obtained by cyanoethylation of a triol having a hydroxyl number of 640 made by oxypropylation of glycerol) is hydrogenated according to the procedure given in Example 60. After removal of the catalyst by filtration, the reaction product is evaporated to a constant weight first at atmospheric then under reduced pressure at a temperature below 100° C. Tris(3-aminopropyl) polyoxypropylglycerol remains as a yellow oil having a faint ammoniacal odor. The product has a total-alkalinity and primary amino nitrogen content of 5.18 milliequivalents per gram. Based on the primary amino nitrogen content the triamine has a purity of 87.8 percent.

EXAMPLE 72

Tricyanoethylated polyoxypropyl-1,1,3-tris(4-hydroxyphenyl)propane [obtained by cyanoethylation of a triol having a hydroxyl number of 259 and made by the union of approximately 6 moles of propylene oxide with 1 mole of 1,1,3-tris(4-hydroxyphenyl)propane as described in Example 12] is hydrogenated according to the procedure given in Example 60. After removal of the catalyst by filtration, the reaction product is evaporated first at atmospheric then under reduced pressure at a temperature below 100° C. until the residue no longer loses weight. Tris(3-aminopropyl) polyoxypropyl-1,1,3-tris(4-hydroxyphenyl)propane remains as a pale-brown oil having a faint ammoniacal odor. The product has a total-alklinity of 3.21 milliequivalents per gram and contains 3.14 milliequivalents per gram of primary amino nitrogen. Based on the primary amino nitrogen content the triamine has a purity of 81.6 percent.

Various modifications and embodiments of the inventions described herein can be made without departing from the spirit and scope thereof. Although the preceding specifically illustrates the inventions herein, such is not to be construed as limiting the scope of the inventions except when set forth in the claims.

What is claimed is:

1. α-(2-cyano - loweralkoxy)-ω-(hydrocarbyl)-polyoxyhydrocarbylene, said polyoxyhydrocarbylene having an average molecular weight of from about 450 to about 20,000;
    (a) where said lower alkoxy contains from 2 to about 10 carbon atoms
    (b) said hydrocarbyl consists essentially of
        (i) a 1 to about 8 carbon alkyl group
        (ii) a 4 to about 8 carbon atom saturated cycloaliphatic group
        (iii) phenyl and lower alkyl substituted phenyl where said lower alkyl group contains from 1 to about 2 carbon atoms
    (c) and said oxyhydrocarbylene consists essentially of
        (i) oxyloweralkylene of from 3 to about 12 carbon atoms
        (ii) cyclohexylethyleneoxy
        (iii) styreneoxy
        (iv) mixtures of (c)(i), (c)(ii) and (c)(iii),
        (v) mixtures of (c)(i), (c)(ii) and (c)(iii) and not more than about 50 mole percent ethyleneoxy radicals.

2. α-(2-cyancethoxy)-ω-(n - butyl)-poly-1,2-oxypropylene where said poly-1,2-oxypropylene moiety has an average molecular weight of from about 450 to about 20,000.

3. α-(2-cyanoethoxy)-ω-(n - butyl)-poly-1,2-oxypropylene where said poly-1,2-oxypropylene moiety has an average molecular weight of about 1025.

4. α-(2-cyanoethoxy)-ω-(n - butyl)-poly-1,2-oxypropylene where said poly-1,2-oxypropylene moiety has an average molecular weight of about 1200.

5. α-(2-cyanoethoxy)-ω-(n - butyl)-poly-1,2-oxypropylene where said poly-1,2-oxypropylene moiety has an average molecular weight of about 2025.

6. α-ω-bis-(2 - cyano - loweralkoxy) - polyoxyhydrocarbylene, said polyoxyhydrocarbylene having an average molecular weight of from about 450 to about 20,000;
    (a) where said loweralkoxy contains from 2 to about 10 carbon atoms.
    (b) and said oxyhydrocarbylene consists essentially of
        (i) oxyloweralkylene of from 3 to about 12 carbon atoms
        (ii) cyclohexylethyleneoxy
        (iii) styreneoxy
        (iv) mixtures of (b)(i), (b)(ii), and (b)(iii)
        (v) mixtures of (b)(i), (b)(ii), and (b)(iii) and not more than about 50 mole percent ethyleneoxy radicals.

7. α-ω-bis-(2 - cyanoethoxy)-poly-1,2-oxypropylene-1,4-oxybutylene where said poly-1,2-oxypropylene-1,4-oxybutylene moiety has an average molecular weight of from about 450 to about 20,000.

8. α-ω-bis-(2 - cyanoethoxy)-poly-1,2-oxypropylene-1,4-oxybutylene where said poly-1,2-oxypropylene-1,4-oxybutylene moiety has an average molecular weight of about 1500.

9. α-ω-bis-(2-cyanoethoxy)-poly-1,2-oxybutylene where said poly-1,2-oxybutylene moiety has an average molecular weight of from about 450 to about 20,000.

10. α-ω-bis-(2 - cyanoethoxy) - poly - 1,2 - oxybutylene where said poly-1,2-oxybutylene moiety has an average molecular weight of about 500.

11. α-ω-bis-(2 - cyanoethoxy) - poly - 1,2 - oxybutylene where said poly-1,2-oxybutylene moiety has an average molecular weight of about 1,000.

12. α-ω-bis-(2 - cyanoethoxy) - poly - 1,2 - oxybutylene where said poly-1,2-oxybutylene moiety has an average molecular weight of about 2,000.

13. α-ω-bis-(2-cyanoethoxy) - poly - 1,2 - oxypropylene where said poly-1,2-oxybutylene moiety has an average molecular weight of about 425 to about 20,000.

14. α-ω-bis-(2-cyanoethoxy) - poly - 1,2 - oxypropylene where said poly-1,2-oxybutylene moiety has an average molecular weight of about 425.

15. α-ω-bis-(2-cyanoethoxy) - poly - 1,2 - oxypropylene where said poly-1,2-oxybutylene moiety has an average molecular weight of about 2025 to about 20,000.

16. α-ω-bis-(2-cyanoethoxy) - poly - 1,2 - oxypropylene where said poly-1,2-oxybutylene moiety has an average molecular weight of about 2135 to about 20,000.

17.

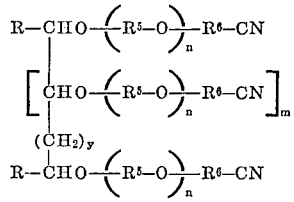

(a) where R is hydrogen or a 1 to about 4 carbon atom alkyl
(b)

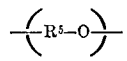

is an oxyhydrocarbylene consists essentially of
    (i) oxyloweralkylene of from 3 to about 12 carbon atoms
    (ii) cyclohexylethyleneoxy
    (iii) styreneoxy
    (iv) mixtures of (b)(i), (b)(ii) and (b)(iii)
    (v) mixtures of (b)(i), (b)(ii) and (b)(iii) with not more than about 50 mole percent ethyleneoxy radicals.

(c) $R^6$ is a lower alkyl containing from 2 to about 10 carbon atoms.
(d) $m$ is an integer from 0 to 8
(e) $y$ is an integer from 0 to 10 where the radical

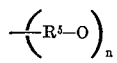

has an average molecular weight of from about 450 to about 20,000.

18. 1,2,6-tris[α-(2 - cyanoethoxy)-poly-1,2-oxypropyl] hexane of the formula:

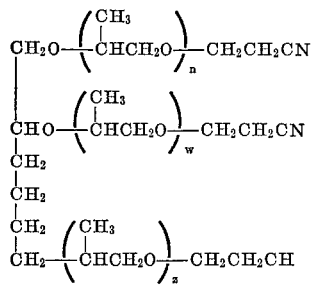

wherein $n$, $w$ and $z$ are positive integers the sum of which is from about 8 to about 250.

19. The composition of claim 18 where the 1,2,6-tris-(poly-1,2-oxypropyl)hexane moiety has an average molecular weight of about 4950.

20. 1,2,3-tris[α-(2 - cyanoethoxy)-poly-1,2-oxypropyl] propane, the 1,2,3-tris(poly-1,2-oxypropyl)propane moiety thereof having an average molecular weight of from about 450 to about 20,000.

21. 1,2,3-tris[α-(2 - cyanoethoxy)-poly-1,2-oxypropyl] propane, the 1,2,3-tris(poly-1,2-oxypropyl)propane moiety thereof having an average molecular weight of about 3,000.

22. A compound of the formula

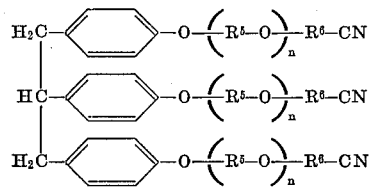

(a) where ($R^5$—) is an oxyhydrocarbylene consists essentially of
  (i) oxyloweralkylene of from 3 to about 12 carbon atoms
  (ii) cyclohexylethyleneoxy
  (iii) styreneoxy
  (iv) mixtures of (b)(i), (b)(ii) and (b)(iii)
  (v) mixtures of (b)(i), (b)(ii) and (b)(iii) with not more than about 50 mole percent ethyleneoxy radicals.
(b) $R^6$ is a lower alkyl containing from 2 to about 10 carbon atoms, where the radical

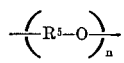

has an average molecular weight of from about 450 to about 20,000.

23. The tris(2-cyanoethoxy)-ether of oxypropylated tris(4-hydroxyphenyl)propane the oxypropylated tris(4-hydroxyphenyl)propane radical having an average molecular weight of from about 450 to about 20,000.

24. The tris(2-cyanoethoxy)-ether of oxypropylated tris(4-hydroxyphenyl)propane the oxypropylated tris(4-hydroxyphenyl)propane radical having an average molecular weight of about 650.

25. Hexa[α-(2 - cyanoethoxy)-poly-1,2-oxypropyl]hexane where said poly-1,2-oxypropyl hexane moiety has an average molecular weight of from about 450 to about 20,000.

26. Hexa[α-(2 - cyanoethoxy)-poly-1,2-oxypropyl]hexane where said poly-1,2-oxypropyl hexane moiety has an average molecular weight of about 660.

References Cited
UNITED STATES PATENTS 3,255,253   6/1966   Kuryla _____ 260—465.6X
3,405,162   10/1968  Kuryla _____ 260—465.6

JOSEPH P. BRUST, Primary Examiner

U.S. Cl. X.R.

260—210, 248, 333, 345.1, 345.9, 395, 448.2, 464, 465.5, 465.6, 468, 473, 484, 514, 520, 535, 563, 571, 584

PO-1050
(5/69)

UNITED STATES PATENT OFFICE
CERTIFICATE OF CORRECTION

Patent No. 3,560,549          Dated February 2, 1971

Inventor(s) Fedor Poppelsdorf

It is certified that error appears in the above-identified patent and that said Letters Patent are hereby corrected as shown below:

Column 28, line 39 - "poly-1,2-oxybutylene", should read --- poly-1,2-oxypropylene ---.

Column 28, line 42 - "poly-1,2-oxybutylene", should read --- poly-1,2-oxypropylene ---.

Column 28, line 45 - "poly-1,2-oxybutylene", should read --- poly-1,2-oxypropylene ---.

Column 28, line 48 - "poly-1,2-oxybutylene", should read --- poly-1,2-oxypropylene ---.

Signed and sealed this 20th day of April 1971.

(SEAL)
Attest:

EDWARD M. FLETCHER, JR.
Attesting Officer

WILLIAM E. SCHUYLER, JR
Commissioner of Patents